United States Patent [19]

Lindblad

[11] 4,043,804

[45] Aug. 23, 1977

[54] RECOVERY OF METAL VALUES FROM COPPER REVERBERATORY SLAG

[75] Inventor: Kenneth O. Lindblad, Anaconda, Mont.

[73] Assignee: The Anaconda Company, New York, N.Y.

[21] Appl. No.: 696,728

[22] Filed: June 16, 1976

[51] Int. Cl.² .............................................. C22B 15/00
[52] U.S. Cl. ...................................... 75/117; 75/115; 423/41
[58] Field of Search ............... 423/41, 45; 75/24, 115, 75/116, 117; 204/108

[56] References Cited

U.S. PATENT DOCUMENTS

| | | | |
|---|---|---|---|
| 35,509 | 6/1862 | Dahne | 423/41 |
| 692,008 | 1/1902 | Frölich et al. | 423/41 |
| 1,043,490 | 11/1912 | Wedge | 423/41 |
| 1,582,347 | 4/1926 | Read et al. | 423/41 |
| 1,674,491 | 6/1928 | Wetherbee | 423/45 |

Primary Examiner—Earl C. Thomas
Assistant Examiner—Brian E. Hearn
Attorney, Agent, or Firm—Pennie & Edmonds

[57] ABSTRACT

A process for the recovery of metals from copper reverberatory slag containing iron in the form of silicates comprising roasting said slag in an oxidizing atmosphere at a temperature of at least about 550° C in the presence of sulfur trioxide for a time sufficient to effect decomposition of substantially all of said iron present in the slag to iron oxide and the other metals therein to water-soluble salts and metal oxides, and separating the water-soluble metal salts and metal oxides from the iron oxide and silica residue.

9 Claims, No Drawings

RECOVERY OF METAL VALUES FROM COPPER REVERBERATORY SLAG

BACKGROUND OF THE INVENTION

This invention is directed to a new process to recover copper and other metallic elements from iron-containing copper smelter reverberatory slag without producing huge quantities of iron sulfate therefrom. Reverberatory slag from copper smelters is mainly composed of iron and aluminum silicates, having relatively low melting points, and copper and zinc. The copper and zinc values are usually present in the form of insoluble silicious material.

Such reverberatory slag has long been treated as a waste product and accumulated slag at smelter sites in various locations of the Western United States probably exceeds 200 million tons containing up to a million tons of copper and as much as 6 million tons of zinc. Several methods have been disclosed for leaching the slag, including those in U.S. Pat. Nos. 3,269,831; 3,273,997; 3,288,597 and 3,632,308. These utilize sulfuric acid to form copper sulfate, but produce large quantities of iron sulfate waste in addition to the copper obtained. The disposal of iron sulfate presents a serious problem since the quantities of iron sulfate produced from leaching operations and various other industrial processes exceeds market demands. Further, the large amount of sulfuric acid required for conventional processing of slag presents cost, equipment and environmental problems.

The recovery of copper from reverberatory slag by a method which avoids the use of large quantities of sulfuric acid and the formation of large quantities of iron sulfate therefrom is, therefore, highly desired.

SUMMARY OF THE INVENTION

The present invention is directed to a new process for recovering copper and other metals from copper smelter reverberatory slag without producing large amounts of water-soluble iron sulfate, a product difficult to dispose of in an environmentally acceptable way.

The present process comprises the process for the recovery of metals from copper reverberatory slag containing iron in the form of silicates comprising roasting said slag in an oxidizing atmosphere at a temperature of at least about 550° C in the presence of sulfur trioxide for a time sufficient to effect decomposition of substantially all of said iron present in the slag to iron oxide and a substantial proportion of the other metals therein to water-soluble salts, and separating the water-soluble metal salts from the iron oxide and silica residue.

DETAILED DESCRIPTION OF THE INVENTION

The starting material from which the valuable minerals are obtained is the waste slag of copper smelter reverberatory furnaces. Typical slag is comprised largely of iron and aluminum silicates which normally have relatively low melting points and are insoluble in water. The slag also contains up to about 1% of copper and up to about 5% zinc in the form of insoluble silicious materials.

The first essential step of the process is roasting of the slag in an oxidizing atmosphere in the presence of sulfur trioxide. The sulfur trioxide can either be formed in situ or added to the roaster as a gas.

In situ formation is preferred and this is accomplished by first forming an intimate and substantially homogeneous mixture of iron sulfate and the slag. The uniform mixture of iron sulfate and slag can be formed by any conventional method which will form a substantially uniform mixture of the components. For example, it can be formed by grinding the slag to about 20 mesh or less (Tyler screen), and adding iron sulfate thereto during the grinding process; or each component can be separately ground, preferably to less than 20 mesh, before mixing. The iron sulfate can also be formed in situ by making a water-slag slurry and allowing the mixture to react with sulfuric acid.

As to proportions, the resultant mixture should contain less than one part by weight of iron sulfate for every part by weight of slag contained therein. Preferably, the resultant mixture contains from greater than 1 to about 5 parts by weight of slag per part by weight of iron sulfate. In addition, the mixture can contain small quantities of water to act as both a lubricant to aid in the formation of a uniform mixture of the materials and to cause the mixture to form a soft coherent solid mass which can be readily processed. The water can be used in amounts up to about 0.5 parts by weight for each part by weight of iron sulfate contained within the resultant mixture and, preferably, can be used in amounts up to about 0.25 parts by weight for each part by weight of iron sulfate.

A substantially homogeneous mixture of the dry particulate material or of the moistened particulate materials can be readily formed with any conventional type of apparatus designed to provide for adequate mixing. Such an apparatus may be a Banbury or Sigma blade mixer or any similar device conventionally used for blending and mixing materials of this type. Alternately, the mixing of the materials may be done while grinding, such as by simultaneously introducing the iron sulfate and reverberatory slag into a grinding apparatus to produce a resultant mixture having the desired particle size and composition.

When the mixture is moistened with small quantities of water, the resultant material may be further conditioned by aging for a period of up to about seven days at ambient temperature.

The formed mixture is roasted in an oxidizing atmosphere at a temperature above 550° C, preferably from about 550° to 700° C and most preferably from about 600° to 650° C. The roasting can be carried out in any conventional manner utilizing any of the furnaces, rotary kilns or fluidized bed reactors used for calcining ores. Preheated oxygen or air is maintained as an oxidizing atmosphere in the roaster.

It is significant to note that the reaction of slag, water and sulfuric acid is highly exothermic. If such mixture is introduced into the roasting operation during or immediately following such reaction, a substantial economy in roasting heat may result. Also, when ferrous sulfate is heated in an oxidizing atmosphere, it is oxidized to ferric sulfate in at least two stages. Somewhat above 200° C, hydrated ferrous sulfate dehydrates and is partially oxidized with attendant evolution of heat. Near 500° C a second oxidation occurs, again with considerable evolution of heat. The presence of sulfur trioxide at this stage promotes the conversion of ferrous to ferric iron, and results in the generation of much heat. Advantages may be taken of the exothermicity of these reactions to conserve on fuel requirements for the roasting operation.

At temperatures above 550° C and in an oxidizing atmosphere, the iron sulfate content of the mixture being roasted decomposes to form iron oxide and sulfur trioxide gas. The exact reaction mechanism is unknown and is believed to be a complex one. The sulfur trioxide which is formed from the decomposition of the iron sulfate acts on the insoluble silicious iron present in the slag material, such as fayalite, to form additional iron sulfate. This newly formed iron sulfate immediately decomposes to iron oxide and sulfur trioxide, which sulfur trioxide, in turn, further attacks additional insoluble silicious iron material to again momentarily form iron sulfate. In effect, a continuous reaction is initiated by the initial iron sulfate added to the slag which results in the continual formation and decomposition of additional iron sulfate until all the iron contained in the slag decomposes to iron oxide and essentially no iron sulfate remains either from that initially introduced or through formation under roasting conditions.

As to roasting time, this must be for a period sufficient to convert substantially all of the iron sulfate added to the slag and the silicious iron present in the slag to iron oxide. In ordinary operations and with the usual slags, this can be accomplished in a period ranging from about one-fourth to 2 hours with a period of one-half to 1 hour being preferred if high recovery rates of copper and zinc are desired.

In addition, the sulfur trioxide formed during the roasting also converts a substantial proportion of the water insoluble copper and zinc materials contained in the slag into water-soluble sulfates. Substantial conversion of the insoluble copper and zinc materials to water-soluble sulfates is obtained when roasting is continued for periods of from about one-half to 1 hour duration. Longer times or temperatures higher than 650° C tend to lower the recovery rate of zinc values and cause greater amounts of the copper and zinc material to be converted into the oxides.

The heat of formation of the iron sulfate generated by the reaction of sulfur trioxide on the silicious iron oxide within the slag will furnish part or all of the heat required to decompose the iron sulfate thus formed. Thus, once the roasting conditions are initiated, the process is substantially a selfsustaining one which requires substantially no input of additional energy.

Following roasting, the calcined residue is leached with water or with dilute sulfuric acid. Water leaching adequately removes all of the copper and zinc sulfate material contained within the calcined residue. If substantial quantities of copper or zinc oxides are in these residues, they may be removed with a dilute sulfuric acid leach. If sulfuric acid leach solution is used, the concentration of the sulfuric acid contained therein should range in amounts of 0.25 to 10% of the leach solution. Leaching is to be done in any conventional manner well known to those skilled in the art and the particulars of such a process are not a part of the present invention. The pregnant copper-zinc leaching solution can be separated from the calcined residue by any conventional method, such as settling, centrifugation, filtration or other means well known to those skilled in the art.

The filtrate from the leaching step, either from an aqueous or sulfuric acid leach, is then treated by any of the usual procedures to recover the copper and zinc. Copper, for example, can be recovered by electrowinning, or by the addition of sufficient zinc dust to the solution to cause complete cementation of the copper and the formation of additional zinc sulfate. The zinc may be recovered by conventional electrowinning procedures in an electrolytic cell using insoluble anodes, aluminum cathodes and a current density of about 50 to 80 amperes per square foot. Alternate recovery procedures can be utilized, such as ion exchange or controlled potential electrolysis. The specific mode of recovery is determined by the feasibility of a particular process and equipment which is readily available.

Leach residue, consisting mainly of iron oxide and silica, can be further treated to form useful products, such as by processing the moist residue of the leaching solution into pellets suitable for use in a steel plant where the iron oxide can be recovered in a steel operation.

The sulfur trioxide material formed during roasting may not be completely consumed by the reactions discussed. This excess sulfur trioxide can be collected in a scrubber to be combined with water to form dilute sulfuric acid which can be used, when necessary, as part of the leaching solution of the calcined product. The amount of excess sulfur trioxide which is produced is normally small due to the fact that the major portion is consumed by the reactions occurring within the roasting mixture in which the silicious iron is transformed into a more useful iron oxide form and the insoluble copper and zinc materials are formed into water-soluble salts.

In the alternative, one may process the slag material to recover useful products therefrom by directly treating dry ground slag having a particle size of 20 mesh or smaller in a roasting furnace having an oxidizing atmosphere of oxygen or air in combination with sulfur trioxide and water vapor. The quantity of sulfur trioxide required is small in relation to the quantity of slag. Normally, amounts ranging from about one-twentieth to about one-third part per part by weight of slag, and preferably from about one-tenth to about one-fourth, should be present.

The present process has been found to be effective for recovering up to about 85% of the copper and zinc values contained in common copper reverberatory slag materials. The present process is both an effective and an efficient method for recovering the copper and zinc contained within the reverberatory slag and further to form an iron oxide product useful for steelmaking operations.

The invention will be further described in connection with the following examples which are set forth for purposes of illustration only and are not to be construed as limiting the scope of the invention in any manner.

EXAMPLE I

Preparation of Slag Iron Sulfate Mixture

Copper smelter reverberatory slag was ground to particle size capable of passing through −100 mesh. A series of mixtures were prepared by mixing the slag with iron sulfate (20 mesh) in ratios of 1:5, 1:3 and 1.1:1. To each sample was added 0.25 parts by weight water per part iron sulfate. The resultant coherent mixtures were of substantially uniform dispersion.

Roasting

Samples of each of the above-prepared mixtures were introduced into a muffle furnace having a temperature of 600° C. The closed furnace had a static air atmosphere. Samples of each mixture were roasted for periods of 0.5, 1 and 2 hours, respectively, removed from the oven and cooled to ambient temperature. Examination of the calcined samples showed no iron sulfate to be present.

Separating of Soluble Salts

10 Parts of each sample were treated with 1,000 parts of warm (70°–90° C) water over a one-hour period. The combined slurry was filtered. The filtrates were analyzed and gave an average of 65–75 percent recovery of copper and 30 to 50 percent recovery of zinc.

EXAMPLE II

The procedure of EXAMPLE I was repeated except that the calcined samples were leached with an aqueous 1 percent sulfuric acid solution instead of water. The filtrates were analyzed for copper and zinc. Copper recovery was 75 to 85 percent based on the copper content in the slag and 60 to 85 percent recovery for zinc based on zinc content in the slag.

EXAMPLE III

Copper and zinc values were recovered from copper smelter reverberatory slag as described in EXAMPLE I above except that the roasting was done at 650° C. The results were the same as given in EXAMPLE I above.

EXAMPLE IV

Three homogeneous mixtures of iron sulfate and slag were prepared by mixing three 100 gram portions of ground slag with 50 grams of water each. To each mixture respectively 20 grams, 30 grams and 50 grams of sulfuric acid was added with vigorous stirring. Substantially all of the sulfuric acid reacted with the slag to form a uniform mixture containing respectively 20%, 30% and 50% iron sulfate. These batches were then roasted and leached as described in EXAMPLE I, with comparable results.

While the invention has been described in connection with preferred embodiments, it is not intended to limit the invention to the particular forms set forth, but, on the contrary, it is intended to cover such alternatives, modifications and equivalents as may be included within the spirit and scope of the invention as defined by the appended claims.

What is claimed is:

1. A process for the recovery of metals from copper reverberatory slag containing iron in the form of silicates comprising:
    forming a substantially homogeneous mixture of iron sulfate and slag having from greater than about one to about five parts by weight slag per part iron sulfate,
    roasting said mixture in an oxidizing atmosphere at a temperature of at least about 550° C. for a time sufficient to effect decomposition of substantially all of the iron sulfate to iron oxide and the copper values to water soluble copper salts, and
    separating the water soluble copper salts from the iron oxide and silica.

2. The process of claim 1 wherein the homogeneous mixture contains up to about 0.5 parts by weight of water per part of iron sulfate.

3. The process of claim 1 wherein the slag and iron sulfate of the mixture have particle size of 20 mesh (Tyler) or less the mixture contains up to about 0.5 part by weight water per part iron sulfate and the roasting temperature is from at least about 550° C. to 700° C.

4. The process of claim 3 wherein the water-soluble copper salts are separated by leaching the roasted material with an aqueous solution, separating the pregnant leach solution from the silicious iron oxide residue, and treating the pregnant leach solution to separate out the copper contained therein.

5. The process of claim 3 wherein the roasting occurs at a temperature of from about 600° to 650° C for a period of from about 0.5 to 1 hour.

6. The process of claim 3 wherein the oxidizing atmosphere is oxygen.

7. The process of claim 1 wherein the slag is in particulate form of 20 mesh (Tyler) or less.

8. The process of claim 7 wherein the roasting temperature is from about 600° to 700° C and the oxidizing atmosphere is oxygen.

9. The process of claim 8 wherein the roasting is performed for a period of from about 0.5 to 1 hour.

* * * * *